UNITED STATES PATENT OFFICE.

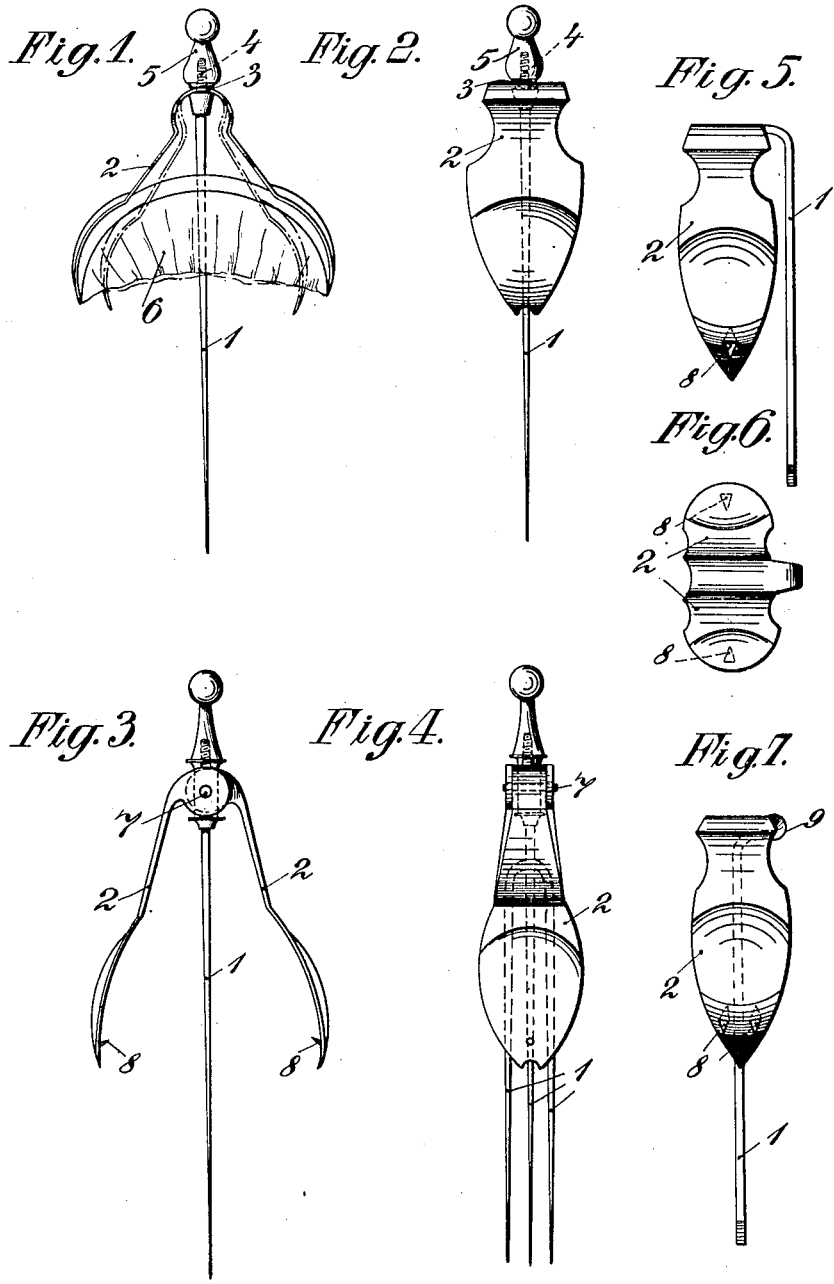

CENTA DOLL, OF DARMSTADT, GERMANY.

DEVICE FOR SQUEEZING LEMON-SLICES.

No. 913,365.  Specification of Letters Patent.  Patented Feb. 23, 1909.

Application filed December 20, 1907. Serial No. 407,420.

*To all whom it may concern:*

Be it known that I, CENTA DOLL, a subject of the German Emperor, and resident of 3 Kirchstrasse, Darmstadt, Germany, have invented certain new and useful Improvements in Devices for Squeezing Lemon-Slices, of which the following is a specification.

The invention relates to a device for squeezing lemon slices, such as those served up with dishes.

The essential point of the invention is the connection of a spit to the actual squeezing device for the lemon slices, so that the complete device with the lemon slices ready for squeezing can be placed with the dishes.

By artistic arrangement of the device it can at the same time be made ornamental.

In the drawing four forms of construction of the invention are shown.

Figure 1 is a side view, and Fig. 2 is a front view of one form of construction with a spring cramp as squeezing device. Figs. 3 and 4 are side and front views showing the use of a squeezer with the squeezing parts joined together by a link, and with the spit constructed as a fork. Fig. 5 shows a front view, and Fig. 6 in plan the construction of the spring cramp and spit in one piece, in which the spit is placed at the side of the spring cramp. Fig. 7 shows the same form of construction with the spit placed between the two arms of the cramp.

According to Figs. 1 and 2 the device consists of a spit 1 to which the spring cramp 2 is attached. The spring cramp has a hole at 3 by which it is placed on the spit 1, at the part 4 which is provided with a thread, and is held tight by screwing up the head 5. The arms of the cramp 2 and the head 5 can be constructed in any desired artistic form so that the complete device may be used as an ornament.

The arms of the cramp 2 are usually in the position shown by the dotted lines. The insertion of the lemon slice is carried out by pushing the spit 1 through the same so that the slice is held between the two arms of the cramp 2 as may be seen in Fig. 1.

In Figs. 3 and 4 it is shown that the spit 1 can have its lower end constructed as a fork. The lemon slice itself is stuck on the fork and brought between the parts 2, 2, which turn on the pivot 7; on the inner side of these parts projections 8 may be placed in order to obtain a better hold of the lemon slice.

In the forms of construction shown in Figs. 5, 6 and 7 a lemon squeezer and spit are constructed from one piece by stamping. Figs. 5 and 6 show the spit 1 placed at the side of the actual squeezing device 2. In this case also the parts 2 are provided with projections 8, so that the lemon slices are held in position, on the one by the spring of the parts 2, and on the other hand by means of the projecting points 8. Fig. 7 again shows the device with the spring cramp and the spit constructed in one piece, the spit being placed between the arms of the cramp, this being done by bending the spit correspondingly at the point 9 after stamping.

The lemon slices with the complete device can be served with the dishes, (as shown in Fig. 1), in such a manner that the spit 1 may be placed in the dish. By simply pressing with the fingers on the arms of the cramp 2 the lemon slices will be squeezed without coming directly into contact with the fingers.

What I claim as my invention and desire to secure by Letters Patent is:—

1. In a device for squeezing lemon slices the combination with a spit of two movable arms fixed to the said spit and adapted for holding and pressing the lemon slices, substantially as set forth.

2. In a device for squeezing lemon slices the combination with a spit of two movable arms fixed to the top end of the said spit and adapted for holding and pressing the lemon slices, the bottom end of the said spit being forked, substantially as set forth.

3. In a device for squeezing lemon slices the combination with a spit of a two-armed spring cramp fixed to the said spit and adapted for holding and pressing the lemon slices, substantially as set forth.

In testimony whereof I have hereunto signed my name this 5th day of December 1907, in the presence of two subscribing witnesses.

CENTA DOLL.

Witnesses:
 LOUIS HESS,
 WALTER HAUSING.